No. 875,236. PATENTED DEC. 31, 1907.
A. J. BAUR.
FASTENING DEVICE FOR SPLIT CARNATIONS.
APPLICATION FILED JAN. 7, 1907.

Witnesses

Inventor
Armin J. Baur
by H. C. Lord
Attorney

UNITED STATES PATENT OFFICE.

ARMIN J. BAUR, OF MILLCREEK TOWNSHIP, ERIE COUNTY, PENNSYLVANIA.

FASTENING DEVICE FOR SPLIT CARNATIONS.

No. 875,236.

Specification of Letters Patent.

Patented Dec. 31, 1907.

Application filed January 7, 1907. Serial No. 351,059.

*To all whom it may concern:*

Be it known that I, ARMIN J. BAUR, a citizen of the United States, residing in Millcreek township, in the county of Erie and State of Pennsylvania, have invented new and useful Improvements in Fastening Devices for Split Carnations and the Like, of which the following is a specification.

This invention relates to fastening devices for split carnations and the like and consists in certain improvements in the construction thereof as will be hereinafter fully described and pointed out in the claims.

In the growth of carnations, it is not unusual for the flower in its development to break the calyx. The flower afterwards develops to its full extent, but the "split" calyx so deforms it as to make it unmarketable.

The object of this invention is to remedy this defect in the flower by securing the edges of the calyx together.

It has apparently been generally supposed that the reason of the split carnation was because of a weak calyx, and so far as I am aware, the only method suggested for remedying the defect has been to bind the entire flower so as to effect a closure of the calyx. This is unsightly and consequently does not accomplish the purpose that is desired. I have found that the calyxes do not split because they are peculiarly weak, but because of an uneven development in the petals, usually caused by bad weather stunting the outer part of the flower, while that inclosed by the calyx develops to such an extent while still within the calyx as to cause the breaking of it. Afterwards the petals fully develop so that the calyx may be closed.

Figure 1:
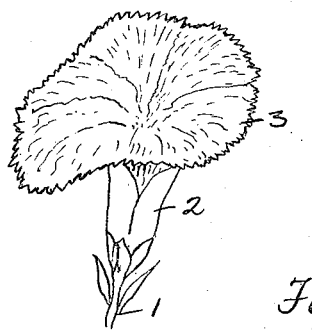
Figure 2:
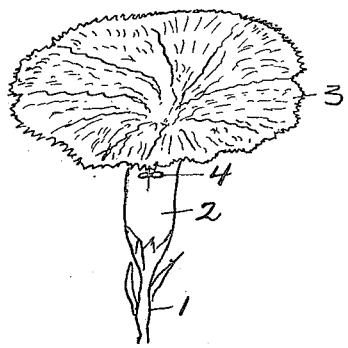
Figure 3:
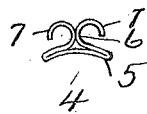

The invention is illustrated in the accompanying drawings as follows:

Figure 1 shows an elevation of a split carnation before closure. Fig. 2, the same flower after closure. Fig. 3, an elevation of the fastener.

1 marks the flower stem, 2 the calyx and 3 the petals.

4 marks the fastener by means of which the edges of the calyx are secured together. The fastener comprises the protruding base portion 5, the tongue 6 and prongs 7. The fastener is preferably formed as shown in Fig. 3 of a single piece of wire, the base portion being formed by bending back the wires from each end, turning the same into the extension 6 and forming the prongs 7.

The flower is manipulated, so as to get the petals within the calyx. The fastener is then placed with the part 5 between the calyx and petals. The tongue 6 extends out between the edges of the calyx, and a prong 7 over each edge of the calyx. The prongs 7 are then clenched passing through the edges of the calyx and securing them together as clearly shown in Fig. 2. The clenching of the prongs are preferably sufficient to effect some clamping action, so that this is also effective in holding the edges together. These fastenings perfectly support and hold the flower and still are so small as to be ordinarily unnoticeable, so that deformed flowers of this kind may find a ready market as first quality flowers.

What I claim as new is:

1. In a fastening for split carnations and the like, the combination with the calyx and petals of the flower of a metallic fastener comprising parts extending through the edges of the calyx and laterally between the calyx and the petals for securing the edges of the calyx.

2. In a fastening for split carnations and the like, the combination with the calyx of the flower of means comprising a metal device having the laterally extending base; a tongue extending intermediate the ends of the base; and prongs on the tongue, the base being arranged at one side of the edges of the calyx, the tongue extending between the edges and the prongs being secured to the edges.

3. A fastening for securing the edges of the calyx of split carnations and the like comprising a metal base portion; a tongue extending therefrom intermediately of the ends of the base; and prongs extending from the tongue in position to be closed on the edges of the calyx for securing the same.

In testimony whereof I have hereunto set my hand in the presence of two subscribing witnesses.

ARMIN J. BAUR.

Witnesses:
B. H. PHILLIPS,
B. F. PARKER.